(12) United States Patent
Moliton

(10) Patent No.: US 7,702,199 B2
(45) Date of Patent: Apr. 20, 2010

(54) LIGHT PIPE FOR MAKING AN ELECTRONIC DISPLAY ARRANGEMENT

(75) Inventor: Renaud Moliton, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 10/593,188

(22) PCT Filed: Mar. 31, 2005

(86) PCT No.: PCT/FR2005/050203

§ 371 (c)(1),
(2), (4) Date: Jul. 23, 2007

(87) PCT Pub. No.: WO2005/101093

PCT Pub. Date: Oct. 27, 2005

(65) Prior Publication Data

US 2007/0297056 A1    Dec. 27, 2007

(30) Foreign Application Priority Data

Apr. 2, 2004    (FR) .................................. 04 50655

(51) Int. Cl.
*G02B 6/34* (2006.01)
(52) U.S. Cl. ........................................ 385/37; 359/708
(58) Field of Classification Search .................. None
See application file for complete search history.

(56) References Cited

U.S. PATENT DOCUMENTS

| | | | | |
|---|---|---|---|---|
| 4,711,512 A | | 12/1987 | Upatnieks .................... 350/3.7 |
| 4,784,118 A | * | 11/1988 | Fantone et al. .............. 600/160 |
| 5,050,946 A | * | 9/1991 | Hathaway et al. ............. 385/33 |
| 5,188,092 A | * | 2/1993 | White ......................... 600/167 |
| 5,574,580 A | * | 11/1996 | Ansley ........................... 349/5 |
| 5,889,567 A | * | 3/1999 | Swanson et al. .............. 349/62 |
| 6,023,372 A | | 2/2000 | Spitzer et al. ............... 356/630 |
| 6,057,966 A | * | 5/2000 | Carroll et al. ............... 359/630 |
| 6,125,228 A | * | 9/2000 | Gong ........................... 385/146 |
| 6,222,677 B1 | * | 4/2001 | Budd et al. .................. 359/630 |
| 6,243,149 B1 | * | 6/2001 | Swanson et al. .............. 349/62 |
| 6,259,512 B1 | * | 7/2001 | Mizouchi ...................... 355/67 |
| 6,331,916 B1 | * | 12/2001 | Mukawa ..................... 359/630 |
| 6,349,004 B1 | * | 2/2002 | Fischer et al. ............... 359/708 |
| 6,392,742 B1 | * | 5/2002 | Tsuji ............................ 355/67 |
| 6,542,179 B1 | * | 4/2003 | Kurtz et al. .................. 348/97 |
| 6,671,100 B1 | * | 12/2003 | McRuer ..................... 359/630 |
| 6,771,423 B2 | * | 8/2004 | Geist ........................... 359/630 |

(Continued)

OTHER PUBLICATIONS

International Search Report—Jul. 29, 2005.

*Primary Examiner*—Frank G Font
*Assistant Examiner*—Peter Radkowski
(74) *Attorney, Agent, or Firm*—Sofer & Haroun, LLP

(57) ABSTRACT

The invention relates to a light pipe for use in particular in an electronic display arrangement, and designed to transmit light signals from one of its ends referred to as an entry surface to its other end referred to as an exit surface going towards the eye of a user for viewing a virtual image, the pipe including a diffractive component on one surface, referred to as its improved surface, said diffractive component being an element satisfying the equation of an aspherical body of revolution. According to the invention, said diffractive component is formed directly on said entry surface.

9 Claims, 2 Drawing Sheets

U.S. PATENT DOCUMENTS

| | | | | |
|---|---|---|---|---|
| 6,819,493 | B2 * | 11/2004 | Mizouchi | 359/619 |
| 6,871,982 | B2 * | 3/2005 | Holman et al. | 362/331 |
| 7,145,726 | B2 * | 12/2006 | Geist | 359/630 |
| 7,206,133 | B2 * | 4/2007 | Cassarly et al. | 359/630 |
| 7,230,766 | B2 * | 6/2007 | Rogers | 359/630 |
| 2001/0017604 | A1 * | 8/2001 | Jacobsen et al. | 345/27 |
| 2001/0043166 | A1 * | 11/2001 | Jacobsen et al. | 345/27 |
| 2001/0048493 | A1 * | 12/2001 | Swanson et al. | 349/62 |
| 2003/0030597 | A1 * | 2/2003 | Geist | 345/8 |
| 2003/0184868 | A1 * | 10/2003 | Geist | 359/630 |
| 2005/0063063 | A1 * | 3/2005 | Ashdown | 359/599 |
| 2005/0078378 | A1 * | 4/2005 | Geist | 359/630 |
| 2005/0093757 | A1 * | 5/2005 | Kiernan et al. | 343/781 CA |
| 2005/0136200 | A1 * | 6/2005 | Durell et al. | 428/35.7 |
| 2005/0287490 | A1 * | 12/2005 | Stookey et al. | 433/29 |
| 2006/0119951 | A1 * | 6/2006 | McGuire | 359/630 |
| 2006/0193137 | A1 * | 8/2006 | Chinniah et al. | 362/326 |
| 2007/0123769 | A1 * | 5/2007 | Fuller et al. | 600/405 |
| 2007/0252954 | A1 * | 11/2007 | McGuire et al. | 353/20 |

* cited by examiner

LIGHT PIPE FOR MAKING AN ELECTRONIC DISPLAY ARRANGEMENT

RELATED APPLICATIONS

The present application is a national phase application of PCT/FR2005/050203, which in turn claims the benefit of priority from French Patent Application No. 04 50655, filed on Apr. 2, 2006, the entirety of which are incorporated herein by reference.

FIELD OF THE INVENTION

The present invention relates to a light pipe for making an electronic display arrangement mounted on a frame of the spectacles type.

BACKGROUND OF THE INVENTION

Such a display arrangement is described in U.S. Pat. No. 6,023,372 and is shown in plan view in FIG. 1.

Such an arrangement 10 comprises a housing assembly 16 comprising a first housing 20 containing a circuit for receiving data or images and containing an image-generator assembly. The light transmitted by the image-generator assembly is relayed via an optical device 14 to the eye of the user, e.g. through a lens 24 of a pair of spectacles. This light pipe 14 comprises a transparent rectilinear optical relay 26 transmitting light along its longitudinal axis A-A', and a deflector assembly 28 comprising a mirror 30 disposed on a surface that is inclined relative to the first axis A-A' and an aspherical lens 32 disposed in register with the inclined wall and having an axis of revolution B-B' which, in this example, is perpendicular to the first axis A-A'. The housing assembly 16 is mounted on one of the temples 34 of a frame for a pair of spectacles by a fastener arrangement 36.

The pipe presents a given maximum height $H_{max}$ outside the thickness of the lens, and a given mean length $L_{moy}$ along its longitudinal axis A-A'. By way of example, such a prior art light pipe presents a maximum height $H_{max}$ of 11 millimeters (mm) and a mean length $L_{moy}$ of 32 mm. With such a prior art arrangement, it is possible to obtain an image as seen by the user that has an apparent angular size of 11.5°.

The pipe is advantageously made of thermoplastic material.

OBJECT AND SUMMARY OF THE INVENTION

The object of the invention is to make it possible to obtain an image of larger size while conserving good image quality and regardless of the length $L_{moy}$ of the pipe.

With the prior art arrangement, any magnification of the image leads inevitably to problems of image quality, and in particular to the optical defects known as chromatic aberration and more particularly transverse chromatic aberration. Monochromatic aberrations also increase considerably.

U.S. Pat. No. 6,349,004 describes an optical arrangement for use in particular in an electronic display arrangement and designed to transmit light signals from one of its ends known as an entry surface to its other end known as an exit surface going towards the eye of a user in order to enable a virtual image to be viewed. That arrangement includes a diffractive component which is an element satisfying the equation for an aspherical body of revolution.

In that prior art arrangement, the optical arrangement is constituted by a plurality of optical elements that are assembled together and the diffractive component is constituted by a separate lens which is placed in front of an assembly of optical elements, at the entry for light signals.

That embodiment using a plurality of elements or lenses is complex and expensive to assemble.

The invention solves this problem by providing a light pipe that is made as a single piece and that can, for example, be fabricated by injection molding a plastics material, while nevertheless providing an image that is large in size and of good quality.

To do this, the invention provides a light pipe for use in particular in an electronic display arrangement, and designed to transmit light signals from one of its ends referred to as an entry surface to its other end referred to as an exit surface going towards the eye of a user for viewing a virtual image, the pipe including a diffractive component on one surface, referred to as its improved surface, said diffractive component being an element satisfying the equation of an aspherical body of revolution, and being formed directly on said entry surface.

This embodiment presents the advantage that the diffractive surface is then inside the display arrangement and is not exposed to being soiled by dust.

It is thus possible to obtain a pipe enabling an image to be displayed that presents an angular size of more than 15° and that is of good quality.

A pipe of the invention is fabricated as a single piece, preferably of molded thermoplastic material. It is therefore relatively simple to fabricate and advantageous in cost.

Furthermore, it is advantageous to have a length of pipe that is relatively long, since it is by means of this length that the wearer can retain a view of the surroundings in transparency through the relay of the pipe. The invention solves the problem of image quality while maintaining a length of pipe that is sufficient to enable the wearer to conserve a good view of the surroundings through the pipe.

The term "diffractive component" is used herein to mean an optical component that modifies wave fronts by segmenting them and redirecting the segments by using interference and phase control.

In a preferred embodiment, the diffractive component is an element of the "kinoform" type.

The term "element of the kinoform type" is used herein to mean a diffractive element having phase control surfaces that vary gently and smoothly.

Advantageously, it is a "kinoform" type element satisfying the equation of an aspherical body of revolution modulo a step size.

In addition, and advantageously, at least one of said surfaces is an aspherical surface comprising a "working" surface through which the light passes and presenting local curvature of sign that changes at least once.

This structure enables the quality of the image to be increased by controlling in highly satisfactory manner the level of astigmatism and of field curvature in the image.

The aspherical surface may be the exit surface which, still more advantageously, is a surface of revolution. Advantageously it also provides the bulk of the optical power of the light pipe.

Said improved surface is preferably also an aspherical surface.

Advantageously, said aspherical surface is a surface of revolution.

Advantageously, said aspherical surface includes on said working surface at least one point of inflection in its radial profile for which the second derivative relative to radial distance from the center of the working surface passes through zero and changes sign.

The image of the diffractive component may have proximity of less than −4 diopters, and more precisely less than −10 diopters, or it may have proximity greater than 0 diopters.

Preferably, the invention provides a pipe as specified above including an optical relay formed by a rectangular bar for transmitting light along its longitudinal axis, referred to as its "first" axis, and presenting at one of its ends said entry surface and at its other end both a reflecting wall that is inclined relative to said first axis and an exit surface with an axis of revolution that is contained in a longitudinal plane of symmetry.

The invention also provides an electronic display arrangement suitable for mounting on a frame of the spectacles type or on a specific system enabling it to be positioned in front of the eyes of a user, and including at least one light pipe as specified above.

The display arrangement may comprise two light pipes so as to provide a display that is binocular or biocular.

BRIEF DESCRIPTION OF THE DRAWINGS

The invention is described below in greater detail with reference to figures that merely show a preferred embodiment of the invention.

MORE DETAILED DESCRIPTION

Figure 1:
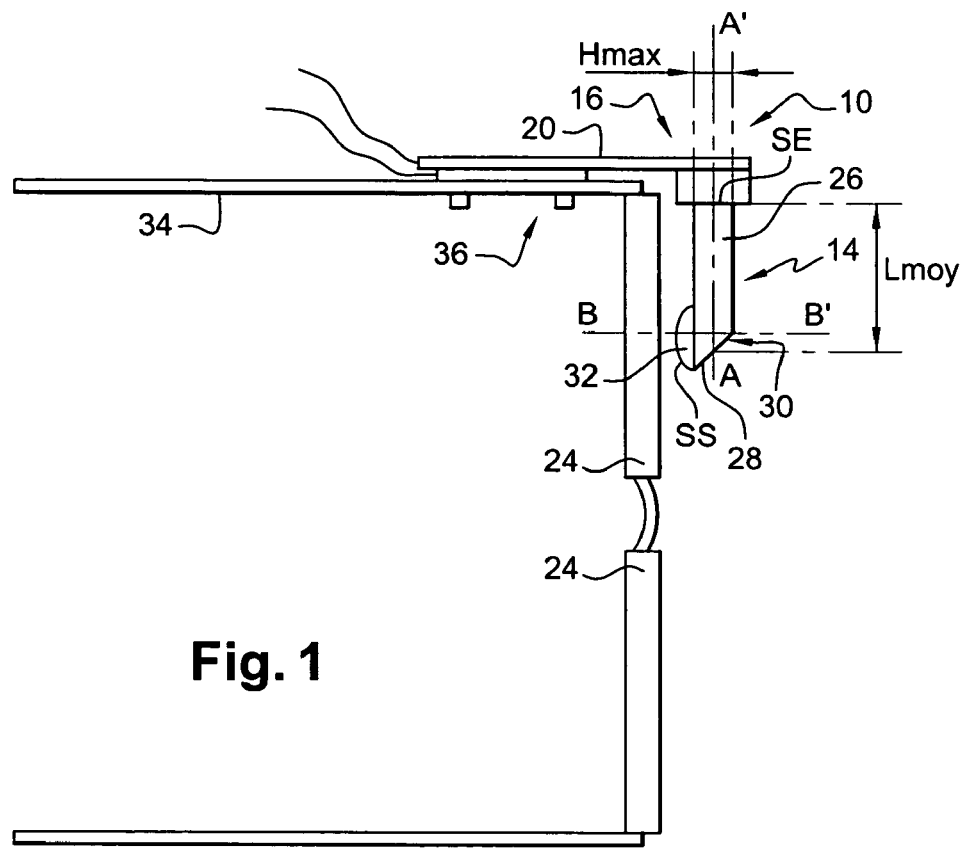
FIG. 1, a view from above of a prior art electronic display arrangement mounted on a spectacles-type frame, is described above.

FIG. 1 shows an embodiment of a light pipe and a technique for mounting the pipe, specifically on a frame of the type used in a pair of spectacles.

In the context of the invention, the light pipe 14 can be slightly different.

Figure 2:
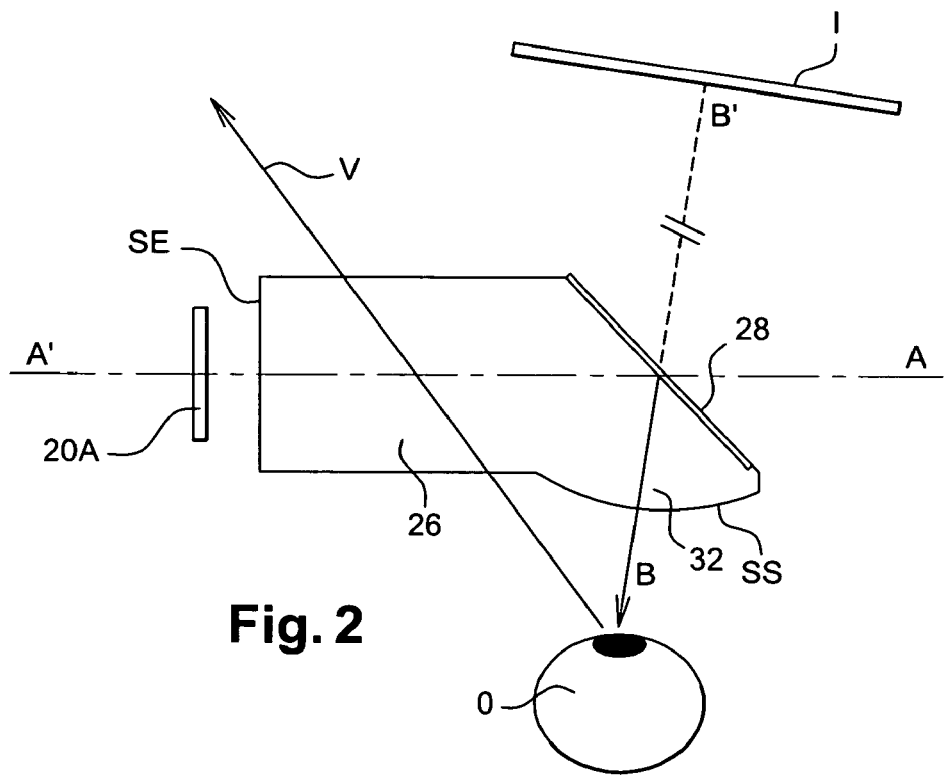
FIG. 2 is a diagrammatic plan view of a variant prior art electronic display arrangement.

This variant is shown in FIG. 2. A micro-screen 20A is shown diagrammatically that is contained in a housing such as the housing 20 shown in FIG. 1. The image seen by the wearer is represented at I.

In this case, the axis of revolution B-B' of the lens 32 is not perpendicular to the first axis A-A' but is inclined at an angle lying in the range 65° to 90° relative to said axis. This enables the light pipe to be ergonomically adapted once mounted, with the pipe following the shape of the user's face, where the user is represented by an eye O.

Furthermore, the pipe may also be mounted on a specific system for being mounted in front of the eyes of a user, i.e. a system other than a spectacles frame.

FIG. 2 also shows the advantage of having a relay 26 that is relatively long. By means of this length, the wearer can conserve a view of the surroundings in transparency through the relay of the pipe. This view is represented by arrow V.

In this embodiment, the light pipe thus comprises an optical relay 26 formed by a rectangular bar designed to transmit light along its longitudinal axis A-A', referred to as the "first" axis, and presenting at one of its ends an entry surface SE, and at its other end, both a reflection wall 28 that is inclined relative to said first axis and an exit surface SS, more precisely a lens 32 having an axis of revolution B-B' contained in a longitudinal plane of symmetry.

Figure 3:
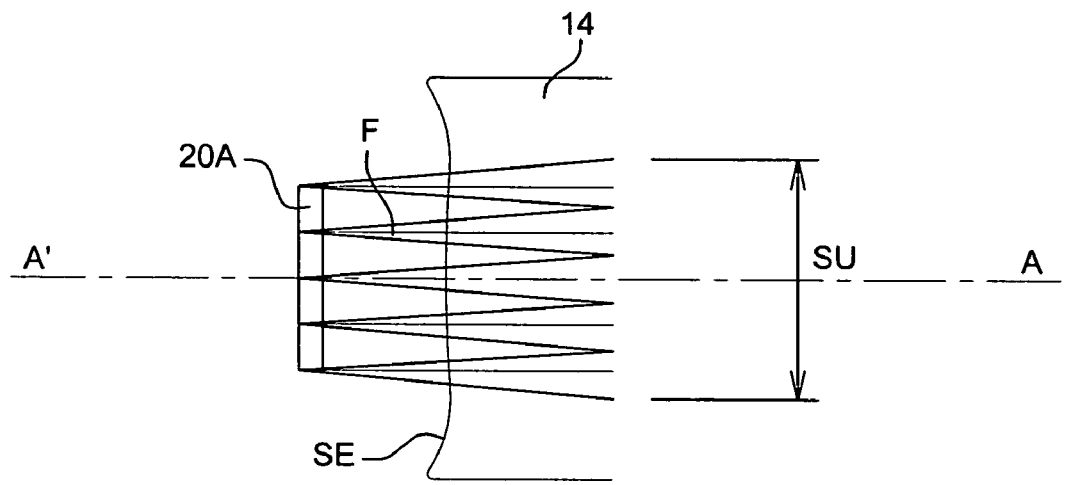
FIG. 3 is a fragmentary section view on the axis A-A' of the light pipe in accordance with the invention.
Figure 4:
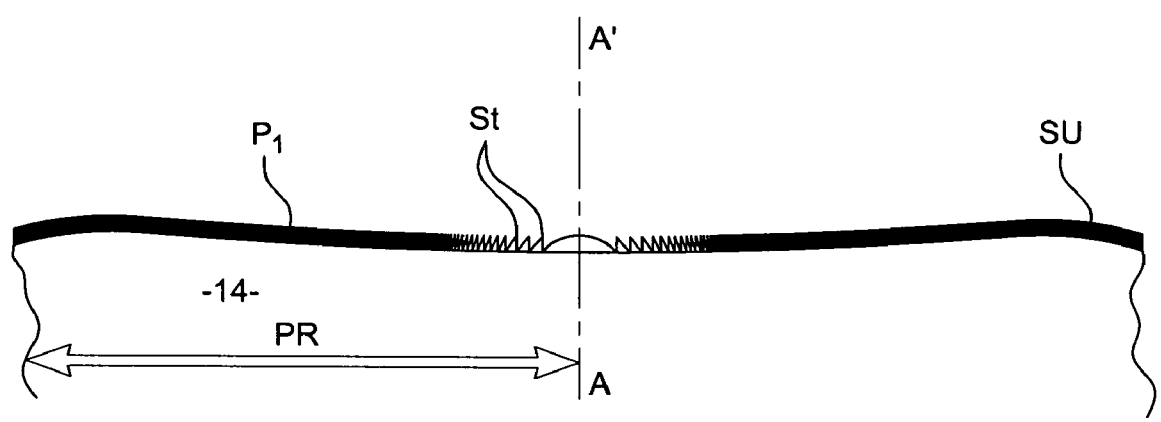
FIG. 4 is a more detailed fragmentary view in section on the axis A-A' of the entry surface of the light pipe in accordance with the invention.

In the preferred embodiment of the invention, in order to be able to obtain an image of large size, while conserving an image of good quality, the entry surface SE is shaped as shown in FIGS. 3 and 4.

FIG. 3 shows the entry surface SE of the pipe 14 together with the associated micro-screen 20A. Light beams F are emitted from the micro-screen 20A. The working surface SU is the portion of the entry surface through which these light beams coming from the micro-screen pass and propagate to the pupil of the user's eye, which pupil is advantageously assumed to have a diameter of 8 mm, at least when calculating the area of the working surface.

Since the entry surface SE is provided with a diffractive component, and more precisely a diffractive surface shaped directly on the entry surface and possessing discontinuous rings of the "kinoform" type, the remainder of the optical design is adapted in such a manner that the image of this entry surface as perceived by the wearer is situated outside the focusing range of the wearer. By way of example, in the embodiment of the invention, this viewing proximity of the image of the entry surface SE is less than −4 diopters, and preferably less than −10 diopters, or else this proximity in terms of diopters is positive, with the image then being situated "behind the wearer's head". In this way, the wearer is never disturbed by a parasitic image of the diffractive component.

Transverse chromatic aberration can be calculated from the wavelength values for the red and blue emission peaks of the micro-screen 20A. Typically, this value is 460 nanometers (nm) for red and 630 nm for blue. Advantageously, at least one additional wavelength is taken into account, situated at the green emission peak of the micro-screen, i.e. about 516 nm, so as to take account of the folding effect of the chromatic aberration spot.

Preferably, the power of the diffractive component is selected in such a manner that the value of the transverse chromatic aberration perceived by the user is less than 7 arc minutes (arcmins) for a user having a pupil lying at a distance in the range 10 mm to 25 mm from the exit surface SS and situated on the exit optical axis of the signals.

The working surface SU is shown in greater detail in FIG. 4.

It thus presents a diffractive surface for eliminating chromatic aberration, supported by an aspherical surface for controlling the levels of astigmatism and of field curvature.

In this example, the aspherical surface is also a symmetrical surface of revolution. On the working surface SU, the sign of the second derivative of the radial profile of said surface supporting the diffractive surface changes at least once. In the example shown, this surface presents a point of inflection P1 along its radial profile PR satisfying the condition that the second derivative changes sign.

If the equation of the radial profile is written Z(h), that means that on the definition domain or working domain corresponding to the portion of space over which the working surface is defined, there exists at least one value h0 such that:

$(d^2Z/dh^2)(h0)=0$ and changes sign on passing through $h0$.

More generally, said improved surface comprises a "working surface" through which light coming from the micro-screen passes going towards the eye of wearer for which there exists a reversal in the sign of the local curvature.

With the impact height of this working surface SU being written h, the aspherical surface carrying the diffractive component satisfies the following equation:

$$Zsupport(h)=c_1 \cdot h^2/(1+SQRT(1-(1+k_1) \cdot c_1^2 \cdot h^2))+A_1 \cdot h^4+ \\ B_1 \cdot h^6+C_1 \cdot h^8+D_1 \cdot h^{10}+E_1 \cdot h^{12}+F_1 \cdot h^{14}+G_1 \cdot h^{16}+ \\ H_1 \cdot h^{18}+J_1 \cdot h^{20}$$

where:

Zsupport (h) is the coordinate of the surface parallel to the axis z;

$c_1$ is the curvature at the pole of the surface;

$k_1$ is the conic coefficient; and $A_1, B_1, C_1 \ldots$ represent the polynomial coefficients of the asphericity of the surface.

Zsupport (h) is the general equation of an aspherical surface of revolution.

The diffractive surface is in the form of concentric bands St on said working surface SU: it constitutes a so-called "kinoform" profile.

The equation for the diffractive surface is written like that for an aspherical surface of revolution, modulo a step size s:

$$D(h)=mod\,[Zdiffract(h), s]$$

where:

$$Zdiffract(h)=c_2 \cdot h^2/(1+SQRT(1-(1+k_2) \cdot c_2^2 \cdot h^2))+A_2 \cdot h^4+ \\ B_2 \cdot h^6+C_2 \cdot h^8+D_2 \cdot h^{10}+E_2 \cdot h^{12}+F_2 \cdot h^{14}+G_2 \cdot h^{16}+ \\ H_2 \cdot h^{18}+J_2 \cdot h^{20}$$

where:

Zdiffract (h) is the coordinate of the surface parallel to the axis z;

$c_2$ is the curvature at the pole of the surface;

$k_2$ is the conic coefficient; and $A_2, B_2, C_2 \ldots$ represent the polynomial coefficients for the asphericity of the surface.

In addition:

$$s=\lambda/[n(\lambda)-1]$$

where:

$\lambda$ is the design wavelength for the diffractive component, generally selected to be in the middle of the visible band in the light spectrum, i.e. in this example 550 nm; and $n(\lambda)$ is the refractive index of the material constituting the light pipe for the design wavelength $\lambda$ under consideration.

Finally, the equation for the surface shown in FIG. 4 is written in the form:

$$Z(h)=Zsupport(h)+Zdiffract(h)$$

Furthermore, in this embodiment, the exit surface is advantageously an aspherical surface of revolution.

The invention is not limited to the embodiment described in detail.

A light pipe of some other type can be used in the invention, the pipe being in general terms equivalent optically speaking to a lens having an entry surface SE and an exit surface SS.

Instead of using the entry surface, it is possible to select the exit surface SS for arranging the diffractive component and the aspherical surface for controlling astigmatism.

What is claimed is:

1. A light pipe for use in particular in an electronic display arrangement, comprising:
   a transparent optical relay made of a single piece, designed to transmit light signals from one of its ends referred to as an entry surface receiving light from a micro display to its other end referred to as an exit surface going towards the eye of a user for viewing a virtual image, the pipe including, a diffractive component, said diffractive component being an element satisfying the equation of an aspherical body of revolution, and being formed directly on said entry surface of said relay.

2. A pipe according to claim 1, wherein the diffractive component is an element of the "kinoform" type.

3. A pipe according to claim 1, wherein at least one of said surfaces is an aspherical surface including a "working" surface through which the light passes and presenting local curvature of sign that changes at least once.

4. A pipe according to claim 3, wherein said aspherical surface is a surface of revolution.

5. A pipe according to claim 3, wherein said aspherical surface includes on said working surface at least one point of inflection in its radial profile for which the second derivative relative to radial distance from the center of the working surface passes through zero and changes sign.

6. A pipe according to claim 1, wherein the image of the diffractive component has proximity of less than –4 diopters.

7. A pipe according to claim 6, wherein the image of the diffractive component has proximity of less than –10 diopters.

8. A pipe according to claim 1, wherein the image of the diffractive component has proximity greater than 0 diopters.

9. A pipe according to claim 1, comprising an optical relay formed by a rectangular bar for transmitting light along its longitudinal axis referred to as a first axis, and presenting at one of its ends said entry surface, and at its other end, both a reflection wall inclined relative to said first axis and an exit surface having an axis of revolution contained in a longitudinal plane of symmetry.

* * * * *